United States Patent [19]

Asano

[11] Patent Number: 5,247,979
[45] Date of Patent: Sep. 28, 1993

[54] RADIAL TIRE WITH SPECIFIED TREAD PROFILE

[75] Inventor: Kazuo Asano, Kobe, Japan

[73] Assignee: Sumitomo Rubber Industries Limited, Kobe, Japan

[21] Appl. No.: 723,302

[22] Filed: Jun. 28, 1991

[30] Foreign Application Priority Data

Jul. 9, 1990 [JP] Japan .................. 2-181948

[51] Int. Cl.$^5$ .................. B60C 11/01; B60C 3/00; B60C 11/00
[52] U.S. Cl. .................. 152/209 R; 152/454
[58] Field of Search .................. 152/454, 209 R

[56] References Cited

U.S. PATENT DOCUMENTS

| 3,961,657 | 6/1976 | Chrobak | 152/454 X |
| 4,296,789 | 10/1981 | Roberts et al. | 152/209 R |
| 4,299,264 | 11/1981 | Williams | |
| 4,700,762 | 10/1987 | Landers | 152/209 R |
| 4,932,452 | 6/1990 | Kawabata et al. | 152/454 |

FOREIGN PATENT DOCUMENTS 58-112804 7/1983 Japan .
60-148702 8/1985 Japan .

Primary Examiner—Caleb Weston
Assistant Examiner—Adrienne C. Johnstone

[57] ABSTRACT

A tire exhibiting improved handling and stability on wet roads when the land ratio (Ra) of the ground bearing surface of the tire at a normal internal pressure under a normal load is in the range of:

$$0.5 \leq Ra \leq 0.58,$$

and the radius of curvature (R2) of the shoulder of the tire and the radius of curvature (R3) of the shoulder edge portion thereof are in the relationship of:

$$14.0 \leq R2/R3 \leq 20.0.$$

1 Claim, 3 Drawing Sheets

RADIAL TIRE WITH SPECIFIED TREAD PROFILE

FIELD OF THE INVENTION AND RELATED ART STATEMENT

1. Field of the Invention

The present invention relates to radial tires having improved wet performance.

2. Description of Background Art

Accidents frequently occurring in recent years on freeways at locations of similar conditions include those due to slippage in the rain. Such accidents, which occur frequently at the same place, can no longer be attributable simply to the violation of safety regulations by drivers. Recent research has revealed that accidents frequently occur on rutted roads which are gently curved.

It appears that accidents occur when the tires of motor vehicles run at a high speed in puddled ruts formed in slightly curved roads. Since recent high-performance tires become flatter, the shoulder of the tire comes into contact with the road surface with an increased pressure when the tire runs on the road, such that when the tire moves along in puddles, the shoulder only contacts the road surface to result in a greatly reduced coefficient of friction. Further because the steering wheel is forcibly controlled by the rut, it is likely that the vehicle will collide with a guardrail or run into an opposite lane.

Various proposals have been made in an attempt to eliminate causes for such accidents by providing improved tires.

Improvements in tires for driving on wet road surfaces include the following.

(1) Diminution of tire wandering.
(2) Improved controllability of tires at cornering limits.
(3) Improved tires for giving higher straight ahead stability to vehicles.

Conventionally, improvements in wet performance have been made primarily by modifying the tread pattern, i.e., by giving an increased sea area to the tread to efficiently drain the tire surface in contact with the ground of water for effective contact of the tire with the ground.

However, recent research has revealed that improved contact of the tire with the ground can not be satisfactorily achieved merely by increasing the sea ratio (the ratio of the groove area of the tread surface to the effective area of contact). More specifically, it has become apparent that the road surface containing a small amount of water is more hazardous than the road surface containing a large amount and that increased sea ratios not only fail to improve handling and stability on puddled rutted roads but also conversely impair the straight ahead stability and wear resistance.

Further it is known to impart lower rigidity to the tread and higher rigidity to the sidewall to give improved ground contact or bearing properties to the shoulder merely for the purpose of diminishing wandering, but this method fails to achieve a great effect as far as wet road surfaces are concerned.

OBJECT AND SUMMARY OF THE INVENTION

Accordingly, an object of the present invention is to provide a radial tire exhibiting improved wet performance to ensure improved handling and stability on puddled rutted roads without entailing impaired straight ahead stability and lower wear resistance.

To fulfill this object, the present invention provides a radial tire which is characterized in that the land ratio $Ra$ of the ground bearing surface of the tire at a normal internal pressure under a normal load is in the range of:

$$0.5 \leq Ra \leq 0.58,$$

and that the radius of curvature, $R2$, of the shoulder of the tire and the radius of curvature, $R3$, of the shoulder edge portion thereof are in the relationship of:

$$14.0 \leq R2/R3 \leq 20.0.$$

In addition to the above feature, the radial tire of the present invention is further characterized in that the radius of curvature, $R1$, of the tread central portion and the radius of curvature, $R2$, of the shoulder are in the relationship of:

$$2.90 \leq R1/R2 \leq 3.10.$$

According to the present invention, the land ratio $Ra$ thus suitably determined permits the tire to drain water effectively on wet roads and increases the pressure acting on the tread per unit area thereof, consequently affording an improved grip and improved handling and stability.

The restriction of numerical values according to the invention has the following significance.

When the land ratio $Ra$ is greater than 0.58, the grooves formed in the tire tread fail to drain water efficiently to impair the contact of the tire surface with wet road surfaces. This results in a lower grip limit for cornering, rendering the vehicle unable to corner with high responsiveness.

Conversely, if the land ratio $Ra$ is smaller than 0.5, impaired handling and stability will result when the vehicle is driven straight forward at a high speed. In other words, the tire then exhibits lower pattern rigidity, therefore becomes less stable when externally disturbed from the road surface and less responsive to a change of lane, and exhibits poor damping and lower wear resistance.

Further when cornering greatly at a relatively low speed, the tire exhibits less wandering if the ratio of the shoulder to the shoulder edge portion in radius of curvature ($R2/R3$) is greater. For cornering at a relatively high speed, the ratio of the tread central portion to the shoulder in radius of curvature ($R1/R2$) is preferably greater.

Conversely, however, lower straight ahead stability will result (at a speed of at least 100 km/h) if the land ratio $Ra$ is too small or the ratios in radius of curvature are excessively great.

When the ratio of the shoulder to the shoulder edge portion in radius of curvature ($R2/R3$) is less than 14.0, surface irregularities of the road are likely to affect steering, rendering the tire prone to wander. If the ratio $R2/R3$ is greater than 20.0, the shoulder edge portion skids greatly and becomes more susceptible to wear.

Further when the ratio of the tread central portion to the shoulder in radius of curvature ($R1/R2$) is below 2.9, wandering and a less comfortable ride will result at a relatively high speed. Conversely, if the ratio $R1/R2$ exceeds 3.1, the shoulder becomes more round-surfaced to entail a lower cornering power and an impaired cornering grip.

The present invention affords improved handling and higher stability on wet roads and serves to reduce slipping accidents which are liable to occur on rutted roads in the rain.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENT

First, the definitions of terms used herein will be given.

Figure 1:
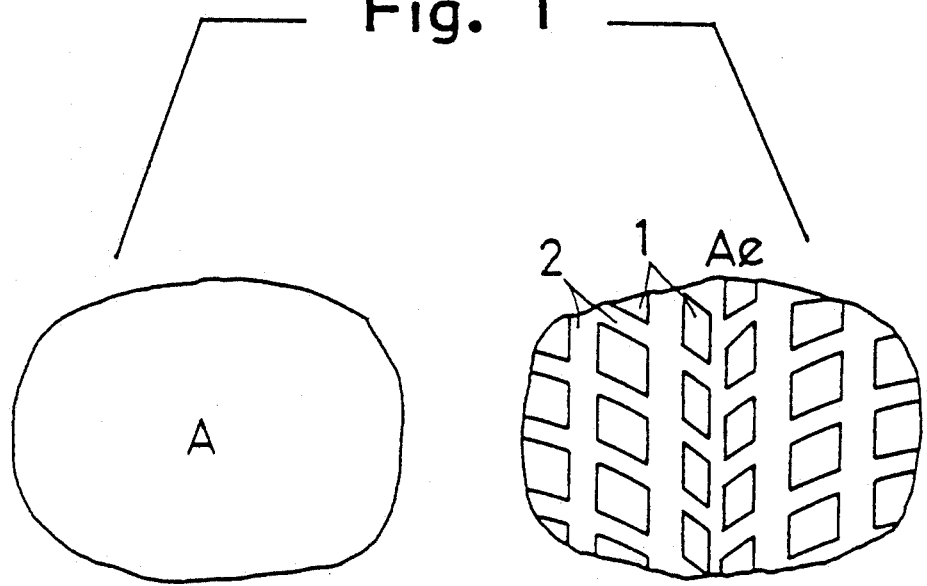
FIG. 1 is a diagram illustrating the land ratio Ra.

With reference to FIG. 1, the term "land ratio Ra" referes to the ratio of the combined area Al of land portions 1 in contact with the ground to the overall area A of contact with the ground including the land portions 1 and sea portions 2, as determined for the surface of the tire bearing on the ground when the tire is fitted to a regular rim, inflated to a normal internal pressure and subjected to a normal load. Thus, the land ratio Ra is expressed by:

$$Ra = Al/A$$

The land ratio Ra is an average value for several portions along the circumference of the tire.

Figure 2:
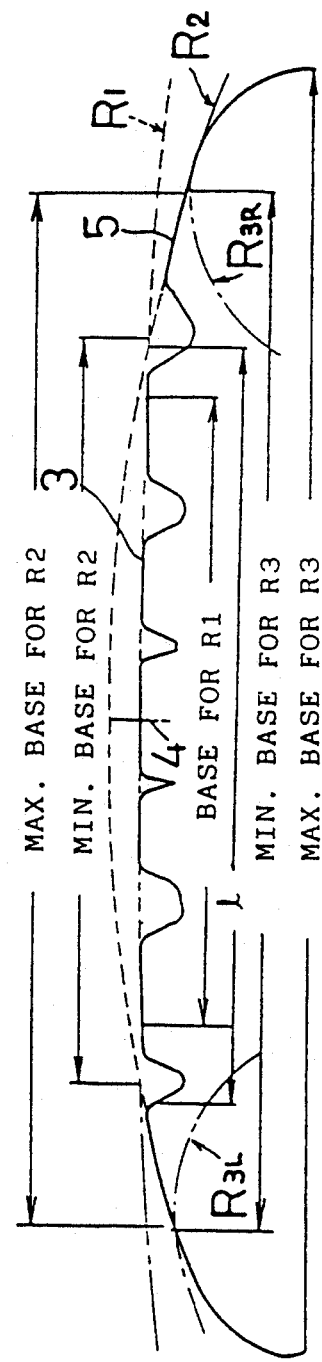
FIG. 2 is a diagram illustrating the radii of curvature of tread portions.
Figure 3:
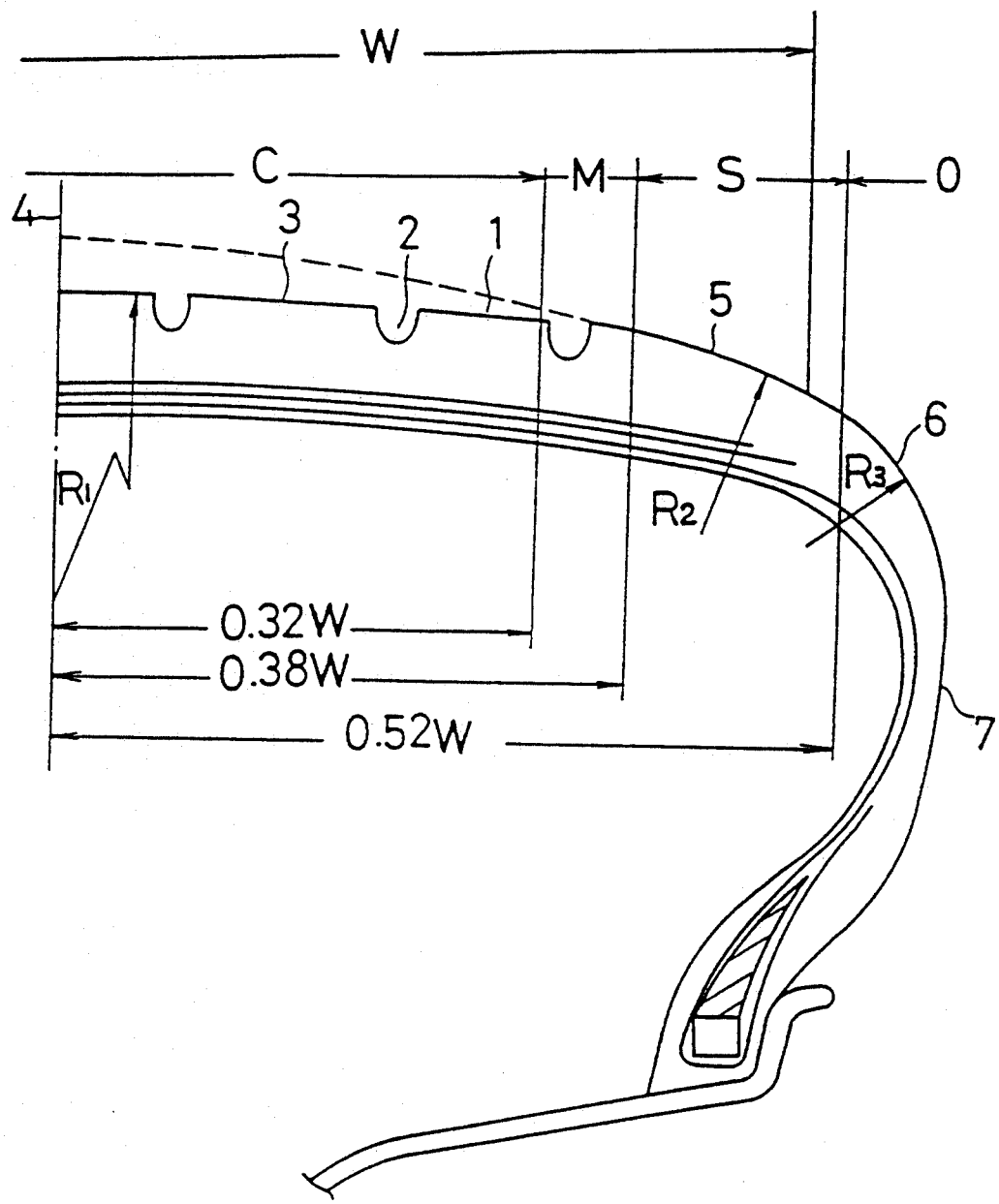
FIG. 3 is an enlarged view of FIG. 2.

FIGS. 2 and 3 show the radius of curvature, R1, of the tread central portion, the radius of curvature, R2, of the shoulder, and the radius of curvature, R3, of the shoulder edge portion. Each of these radii means the radius of a circle most snugly fitting to the tread surface portion concerned.

The width (hereinafter referred to as "base") of the tread for determining the radius of curvature, R1, of the tread central portion 3 is the range of 0.32W from the tire equator 4. W is the width in contact with the ground of the tire.

Similarly, the base for determining the radius of curvature, R2, of the shoulder 5 is the range of from the position of 0.38W from the tire equator 4 to the position of 0.52W therefrom. The base for determining the radius of curvature R3 of the shoulder edge portion 6 is the range of from the position of 0.52W from the tire equator 4 to the outermost end of the portion 6.

The circular arc with the radius R1 of the tread central portion 3 intersects the circular arc with the radius R2 of the shoulder 5 at a point which is located within an intermediate region M shown in FIG. 3.

The circular arc with the radius R3 of the shoulder edge portion 6 is inscribed in the circular arc with the radius R2 of the shoulder 5. The point of contact therebetween is positioned outside a shoulder region S shown in FIG. 3 or inside an outer region O of the drawing.

The circular arc with the radius R3 of the shoulder edge portion 6 extends to the sidewall 7.

The contact width W means the axial maximum width of the tire surface in contact with the ground when the tire is in a static state as fitted to a regular rim, inflated to a normal internal pressure and subjected to a maximum rated load.

Examples will be described below.

Ten kinds of test tires were prepared which had the size of 225/50 R16 and were different in tread radius and pattern as listed in the table to follow, and tested to determine the factors contributing to wet performance.

Thus, the tires were used on wet roads and checked for wet performance.

Three courses of wet roads were used in which tires can be tested for straight ahead stability, cornering capability at a high speed (large turning circle) and cornering capability at a high speed (small turning circle).

The results of the wet performance test were evaluated according to the driver's feeling and expressed in five values of 0 to 5 (involving the evaluation of the rutted tracks). The greater the value, the better. Tires of the invention were used in Examples 1 to 4 given in the table below, and the other examples are comparative.

The results indicate that higher cornering capability is achieved at a low speed when the radius ratio R2/R3 of the shoulder to the shoulder edge portion is greater, and that higher cornering capability is attained at a high speed when the radius ratio R1/R2 of the tread central portion to the shoulder is greater. The results further reveal that the average of the evaluation value for high-speed cornering capability and that for low-speed cornering capability is closely correlated with the land ratio Ra, showing that a smaller land ratio Ra leads to more excellent wet cornering performance. On the other hand, it has been found that a smaller land ratio Ra results in lower straight ahead stability.

Examples 1 to 4 reveal that the invention improves both the cornering capability and the straight ahead stability which are conflicting characteristics on wet roads.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

|       | STD  | Ex. 1 | Ex. 2 | Ex. 3 | Comp. Ex. 1 | Comp. Ex. 2 | Ex. 4 | Comp. Ex. 3 | Comp. Ex. 4 | Comp. Ex. 5 |
|-------|------|-------|-------|-------|-------|-------|-------|-------|-------|-------|
| Ra    | 0.64 | 0.56  | 0.58  | 0.58  | 0.53  | 0.54  | 0.56  | 0.61  | 0.60  | 0.68  |
| R1/R2 | 3.00 | 2.93  | 2.96  | 3.10  | 3.03  | 3.10  | 3.07  | 3.10  | 2.89  | 2.89  |
| R2/R3 | 13.0 | 14.5  | 20.0  | 14.0  | 21.0  | 21.0  | 17.0  | 10.0  | 11.0  | 18.0  |

-continued

| | S'TD | Ex. 1 | Ex. 2 | Ex. 3 | Comp. Ex. 1 | Comp. Ex. 2 | Ex. 4 | Comp. Ex. 3 | Comp. Ex. 4 | Comp. Ex. 5 |
|---|---|---|---|---|---|---|---|---|---|---|
| Wet performance | | | | | | | | | | |
| Low-speed cornering capability | 2.4 | 3.3 | 3.3 | 2.8 | 3.9 | 3.9 | 3.4 | 2.2 | 2.4 | 2.8 |
| High-speed cornering capability | 2.7 | 3.0 | 2.8 | 3.5 | 3.7 | 3.9 | 3.6 | 3.2 | 2.4 | 2.1 |
| Straight ahead stability | | 2.5 | 3.5 | 3.0 | 2.2 | 2.3 | 2.5 | 3.6 | 3.5 | 4.0 |

Test Conditions:
Vehicles: Japanese passenger cars with displacement of 3000 c.c.
Wet test courses: Low-speed cornering: at speed of 90 km/h, 80 mR.
High-speed cornering: at speed of 30 km/h, 80 mR
Straight ahead running: at speed of 180 km/h
Evaluation:
Evaluated by driver's feeling in five values of 0 (lowest) to 5 (highest).

What is claimed is:
1. A radial tire comprising:
a land ratio Ra of the ground bearing surface of a tire at a normal internal pressure under a normal load is in the range of:

$$0.5 \leq Ra \leq 0.58,$$

and that a radius of curvature R2 of a shoulder of said tire and a radius of curvature R3 of a shoulder edge portion thereof are in the relationship of:

$$14.0 \leq R2/R3 \leq 20.0$$

and a radius of curvature R1 of a tread central portion and said radius of curvature R2 of said shoulder are in the relationship of:

$$2.90 \leq R1/R2 \leq 3.10$$

a width of the tread for the radius of curvature R1 of the tread central portion being in the range of 0.32W from the tire equation wherein W is the width of the tire in contact with the ground,
a width of the tread for the radius of curvature R2 of the shoulder is in the range of from the position of 0.38W from the tire equator to a position of 0.52W therefrom, both the radius of curvature R1 of the tread central portion and the radius of curvature R2 of the shoulder having a center which is located on the tire equator,
a width of the tread for the radius of curvature R3 of the shoulder edge portion is in the range of from the position of 0.52W from the tire equator to the outermost end of the shoulder edge portion,
the radius of curvature R1 of the tread central portion intersects the radius of curvature R2 of the shoulder at a point which is located within an intermediate region M which is in the range of 0.32W to 0.38W.

* * * * *